United States Patent
Cheng et al.

(10) Patent No.: US 10,430,901 B2
(45) Date of Patent: Oct. 1, 2019

(54) GRAPHICAL USER INTERFACE FOR DISPLAYING CURRENT AND FUTURE DATA

(71) Applicant: GOOGLE INC., Mountain View, CA (US)

(72) Inventors: Jachin Cheng, Zurich (CH); Petra Ehmann, Zurich (CH); Piotr Buczek, Zurich (CH); Ralf Metzger, Zurich (CH); John Bowen, Gattikon (CH)

(73) Assignee: GOOGLE LLC, Mountain View, CA (US)

( * ) Notice: Subject to any disclaimer, the term of this patent is extended or adjusted under 35 U.S.C. 154(b) by 364 days.

(21) Appl. No.: 15/344,507

(22) Filed: Nov. 4, 2016

(65) Prior Publication Data

US 2018/0130149 A1    May 10, 2018

(51) Int. Cl.
*G06F 16/23*    (2019.01)
*G06Q 30/02*    (2012.01)
(Continued)

(52) U.S. Cl.
CPC ........... *G06Q 50/14* (2013.01); *G06F 3/0481* (2013.01); *G06F 16/2365* (2019.01);
(Continued)

(58) Field of Classification Search
CPC ...... G06Q 50/14; G06Q 3/0481; G06Q 10/02; G06Q 30/0283; G06F 3/0481; G06F 3/30371; G06F 3/30554; G06F 3/30867
See application file for complete search history.

(56) References Cited

U.S. PATENT DOCUMENTS 7,010,494 B2 * 3/2006 Etzioni ................. G06Q 10/02
                                                       705/7.31
7,062,480 B2 * 6/2006 Fay .................... G06F 17/30902
                                                       703/26
(Continued)

FOREIGN PATENT DOCUMENTS

WO    2004/088476 A2    10/2004

OTHER PUBLICATIONS

"Book Now or Wait? Kayak Adds Price Forecasting to Its Flight Search Results," by Rip Empson, Jan. 15, 2013, pp. 1-2. (Year: 2013).*

(Continued)

*Primary Examiner* — Kevin H Flynn
*Assistant Examiner* — Brian Adams Heflin
(74) *Attorney, Agent, or Firm* — Johnson, Marcou & Isaacs, LLC (57) ABSTRACT

Rendering graphical user interfaces to display current and future data to users, the graphical user interfaces generated in response to search queries comprises a flight search system and an airline system. The flight search system receives current flight data and future flight data for the group of flights from an airline system and stores the data on a database. When the flight search system receives a flight search request comprising desired flight data from a user computing device, the system compares the desired flight search data with the stored data to identify one or more flights of the group of flights that match one or more features of the desired flight data. The system presents the current flight data and the future flight data on a graphical user interface to the user when it is likely that the flight data is going to change.

20 Claims, 5 Drawing Sheets

(51) Int. Cl.
*G06Q 50/14* (2012.01)
*G06F 16/248* (2019.01)
*G06F 16/9535* (2019.01)
*G06F 3/0481* (2013.01)
*G06Q 10/02* (2012.01)

(52) U.S. Cl.
CPC ........ *G06F 16/248* (2019.01); *G06F 16/9535* (2019.01); *G06Q 10/02* (2013.01); *G06Q 30/0202* (2013.01); *G06Q 30/0283* (2013.01)

(56) References Cited

U.S. PATENT DOCUMENTS

| | | | | |
|---|---|---|---|---|
| 8,751,272 | B1* | 6/2014 | Seybold | G06Q 30/0629 705/1.1 |
| 2004/0249683 | A1* | 12/2004 | Demarcken | G06F 17/30457 705/5 |
| 2008/0168093 | A1* | 7/2008 | De Marcken | G06F 17/30457 |
| 2008/0262878 | A1* | 10/2008 | Webby | G06Q 10/02 705/5 |
| 2012/0239455 | A1* | 9/2012 | Crean | G06Q 10/02 705/7.31 |

OTHER PUBLICATIONS

"How to Book Cheap Flights Anywhere in the World," by Clint Johnston, Sep. 10, 2015. (Year: 2015).*
Eich, "International Search Report and Written Opinion issued in International Application No. PCT/US2017/053778", dated Nov. 14, 2017, 12 pages.

* cited by examiner

GRAPHICAL USER INTERFACE FOR DISPLAYING CURRENT AND FUTURE DATA

TECHNICAL FIELD

The present disclosure relates to a graphical user interface that provides current and future data. More specifically, a graphical user interface displays current and future data from a data search engine responsive to a request by comparing the request with stored current data and stored future data and displaying the results with a probability of accuracy of the future data.

BACKGROUND

Airlines, booking agents, and other flight data creators and distributors publish data related to flights. The flight data is provided to requestors at a time of request about a certain flight, or flight data is provided for a certain group of flights. For example, if a user is searching for flight data about a particular flight or a particular route, the airline system may provide data related to that flight or a group of similar flights, such as flight times, airplane descriptions, airport stops, and price information. Certain requestors are provided data about all available flights or certain groups of flights, such as the current most popular flights. In conventional systems, the flight search systems request the data from an airline system at the time of a user flight search request. Alternatively, in other conventional systems, the flight search systems store current flight data for certain flights and present the current flight data at the time of a user flight search request. However, such flight data is accurate for a limited period of time and may change in the near future.

SUMMARY

Techniques herein provide computer-implemented methods to render graphical user interfaces to display current and future data to users, the graphical user interfaces generated in response to search queries. The methods include a flight search system that receives current flight data and future flight data for a group of flights from an airline system and stores the data on a database. When the flight search system receives a flight search request comprising a flight data query from a graphical user interface on a user computing device, the system compares the flight data query with the stored data to identify one or more flights of the group of flights whose flight data match one or more features of the flight data query. The system displays on the graphical user interface the current flight data and the future flight data when it is likely that the flight data is going to change.

In certain other example aspects described herein, systems and computer program products to render graphical user interfaces to display current and future data to users, the graphical user interfaces generated in response to search queries are provided.

These and other aspects, objects, features and advantages of the example embodiments will become apparent to those having ordinary skill in the art upon consideration of the following detailed description of illustrated example embodiments.

DETAILED DESCRIPTION

Overview

In certain examples, a flight search system obtains flight data from an airline system. The airline system may be a server for an airline, a ticket broker, an airport scheduling system, a third party server system, or any suitable provider of flight data. In an example, the flight search system may subscribe to a service from the airline system to obtain the flight data. In another example, the flight data may be extracted from a database hosted by the airline system or another system that is accessible by the flight search system, such as over the Internet. In another example, the flight data may be received from the airline system after a request has been made by the flight search system.

The flight data received from the airline system may include any data related to flights, such as flight times, airplane descriptions, airport stops, and price information. The flight data includes the data that is current for flights that may be purchased at the time that the flight data is obtained from the airline system. For example, if a user is requesting data on a particular flight, the flight search system may obtain the current flight data from the airline system and provide an opportunity for the user to purchase a ticket for that particular flight. Additionally or alternatively, the flight data may include information specifying when the flight data will expire. Certain components of the flight data, such as the price for the flight, may only be valid until an expiration date or time. For example, a price for a particular flight may only be valid for one day. The price for the particular flight may change after the expiration of the flight data.

In an example, the flight search system obtains the current flight data, the configured expiration date of the current flight data, and the subsequent flight data. The subsequent flight data may be configured flight data for a period after the expiration of the current flight data. The subsequent flight data may be expected or predicted flight data for a period after the expiration of the current flight data. The flight search system obtains the current flight data and the subsequent flight data and stores the data for presentation to a user.

When a user requests flight data for a particular flight or for a particular route, the flight search system obtains the flight data and presents the flight data to the user on a graphical user interface. For example, the graphical user interface may provide a graphical object or other display that shows one or more flights that match the criteria provided by the user and the flight data associated with each of the one or more flights. The flight data may include the flight times, the airline providing the flight, the destination and departure airports, the flight prices, and other suitable flight data.

In an example, the graphical user interface may provide an additional window or display associated with the likelihood that the price will increase within a configured time. For example, the graphical user interface may include a display stating that the displayed price is likely to increase by 20% the following day.

In another example, a current price displayed for a flight is $300. The graphical user interface provides a superimposed window, such as a popup window, that informs the user that the price is 90% likely to increase to $400 within 24 hours. The information related to the increasing price is provided to the user to increase the likelihood that the user will purchase the ticket at that time.

The likelihood that the price will change to the indicated price is based on an analysis of the flight pricing history. The analysis of the history may include factors such as the accuracy of the subsequent pricing provided by the airline system, the timing and frequency with which the airline system changes subsequent pricing levels, the characteristics of the flight, or other suitable factors.

Thus, the user is provided with current flight data, such as current price to book a flight, and also with a notice that the price is likely to increase the next day. The user is thus encouraged to book a flight before leaving the search session.

By using and relying on the methods and systems described herein, the flight search engine provides flight data responsive to a request from a user by comparing the request with stored current flight data and stored future flight data, and displaying the results on a graphical user interface on a webpage for the user. By storing current data and future flight data, such as the pricing for the next day, the systems and methods described herein may be employed to allow users to make better purchasing decisions. The system is improved for the airline system in that users are encouraged to make purchases at the time of the search. Also, the airline system does not suffer the risk the user will leave the flight search system and search elsewhere. The offers are improved for user in that the user will have notice that the searched flight price is likely being raised the next day. Hence, the methods and systems described herein permit flight search systems to use current flight data and subsequent flight data to provide displays on a webpage that suggest whether flight prices are going to increase the next day.

The flight search system is also improved because when storing the current and future flight data, the flight search system is able to prepare the results on the graphical user interface by searching the database where the data is stored. The flight search system is not required to consult with the airline system for every user flight search. Further, when the future flight data is stored on the flight search system servers, the flight search system is able to present future flight data to the user without the need to perform calculations or estimations of what the future flight data may be.

Example System Architectures

Turning now to the drawings, in which like numerals represent like (but not necessarily identical) elements throughout the figures, example embodiments are described in detail.

Figure 1:
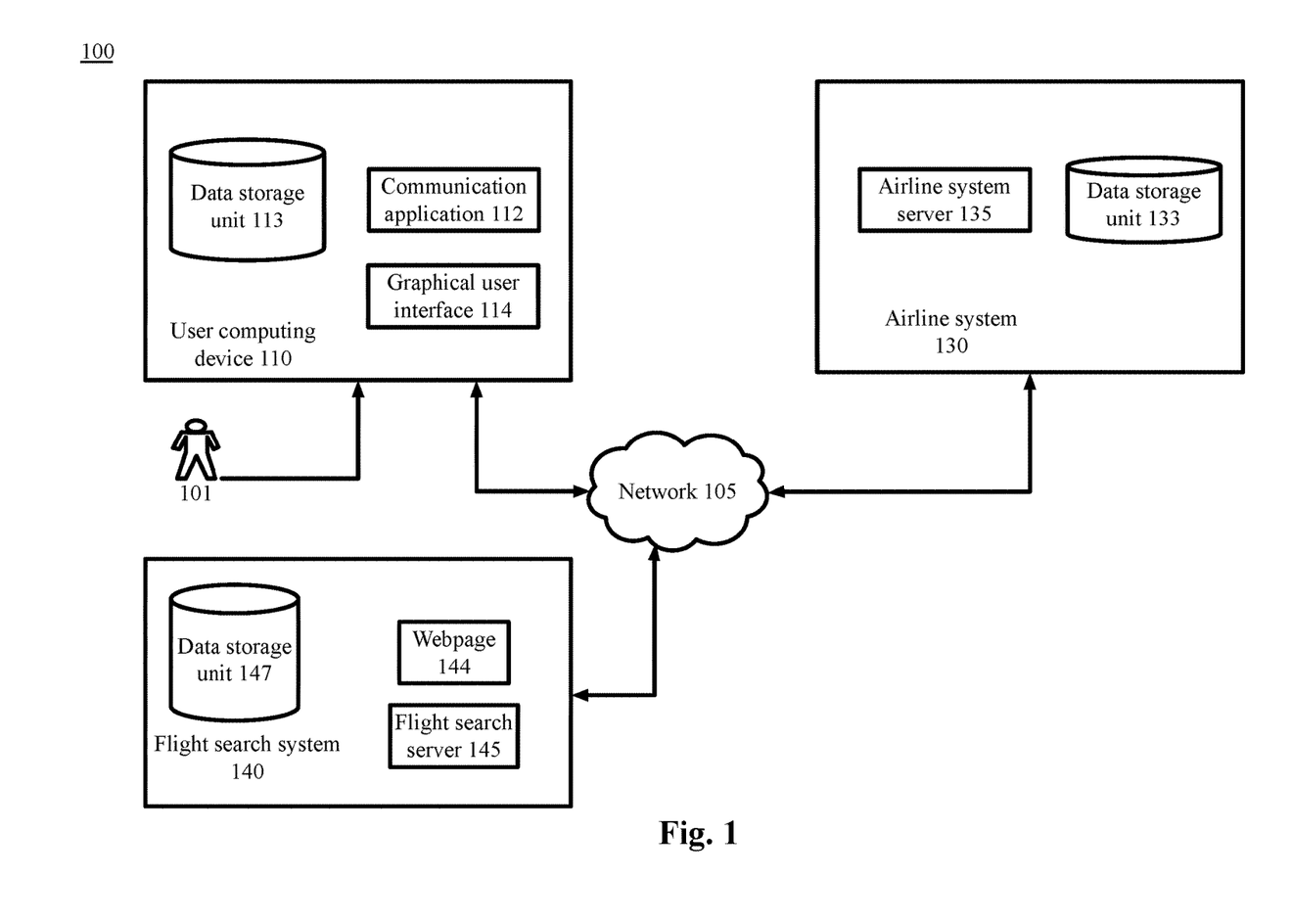
FIG. 1 is a block diagram depicting a system to provide flight data changes via a graphical user interface, in accordance with certain example embodiments.

FIG. 1 is a block diagram depicting a system 100 to provide flight data changes to a graphical user interface, in accordance with certain example embodiments. In some embodiments, a user 101 associated with a user computing device 110 must install an application and/or make a feature selection to obtain the benefits of the techniques described herein.

As depicted in FIG. 1, the system 100 includes network computing devices/systems 110, 130, and 140 that are configured to communicate with one another via one or more networks 105 or via any suitable communication technology.

Each network 105 includes a wired or wireless telecommunication means by which network devices (including devices 110, 130, and 140) can exchange data. For example, each network 105 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data. Throughout the discussion of example embodiments, it should be understood that the terms "data" and "information" are used interchangeably herein to refer to text, images, audio, video, or any other form of information that can exist in a computer-based environment. The communication technology utilized by the devices 110, 130, and 140 may be similar networks to network 105 or an alternative communication technology.

Each network computing device/system 110, 130, and 140 includes a computing device having a communication module capable of transmitting and receiving data over the network 105 or a similar network. For example, each network device 110, 130, and 140 can include a server, desktop computer, laptop computer, tablet computer, a television with one or more processors embedded therein and/or coupled thereto, smart phone, handheld or wearable computer, personal digital assistant ("PDA"), wearable devices such as smart watches or glasses, or any other wired or wireless, processor-driven device. In the example embodiment depicted in FIG. 1, the network devices 110, 130, and 140 are operated by end-users or consumers, airline system operators, and flight search system operators, respectively.

The user computing device 110 includes a graphical user interface 114. The graphical user interface 114 may be used to display information to the user 101 to allow the user 101 to interact with the flight search system 140 and others. The graphical user interface 114 receives user input for queries and displays results to the user 101. The graphical user interface 114 may be managed by the flight search system 140. The graphical user interface 114 may be accessed by the user computing device 110. The graphical user interface 114 may display the webpage 144 of the flight search system 140. The graphical user interface 114 may be provided by the webpage 144 of the flight search system 140 to the user computing device.

The user 101 can use the communication application 112 on a user computing device 110, which may be, for example, a web browser application or a stand-alone application, to view, download, upload, or otherwise access documents or webpages via a distributed network 105. The communication application 112 can interact with web servers or other computing devices connected to the network 105, including the web server 145 of the flight search system 140. In an example, the communication application 112 is a web browser that accesses and displays the webpage 144 of the flight search system 140. The communication application 112 allows the user to enter search functions for a flight or other search and receive results, flight data, advertisements, offers, or other suitable webpage displays. The communication application 112 may alternatively be an application that connects to the flight search system 140 or other systems to search flight data.

The user computing device 110 also includes a data storage unit 113 accessible by the communication application 112 and one or more applications, such as a digital wallet application and an email application. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory. In certain embodiments, the data storage unit 113 may reside in a cloud based computing system.

An example of the one or more airline systems, such as airline system 130 comprises airline system server 135 and a data storage unit 133.

In an example embodiment, the airline system server 135 communicates with the flight search system 140 or other systems to transmit and receive flight data. The airline server 135 receives data from the airline operators, scheduling servers, airports, pricing programs, or other suitable parties (not shown). The airline system server 135 provides flight data to the flight search system 140 or other requestors or subscribers.

In an example embodiment, the data storage unit 133 can include any local or remote data storage structure accessible to the airline system 130 suitable for storing information. In an example embodiment, the data storage unit 133 stores encrypted information.

An example flight search system 140 comprises a flight search system server 145 and a data storage unit 143.

In an example embodiment, the flight search system server 145 communicates with the airline system 130 or other systems over network 105 to request and receive flight data. The flight search server 145 may receive data from the airline systems 130, scheduling servers, airports, pricing programs, and other suitable parties. The flight search system server 145 receives flight data from the airline system 130 or other providers of flight data. The flight search system server 145 provides a webpage 144. The webpage 144 may be utilized by user 101 or others to request flight data, input user information, receive flight data, or perform any other suitable actions. The webpage 144 may be managed or provided by the flight search system server 145 or any other suitable server. The webpage 144 may alternatively represent an interface on an application or other software for interacting with the user 101 or the user computing device 110.

In an example embodiment, the data storage unit 147 can include any local or remote data storage structure accessible to the flight search system 140 suitable for storing information. In an example embodiment, the data storage unit 147 stores encrypted information.

It will be appreciated that the network connections shown are examples and other means of establishing a communications link between the computers and devices can be used. Moreover, those having ordinary skill in the art having the benefit of the present disclosure will appreciate that the airline system 130, flight search system 140, and the user computing device 110 illustrated in FIG. 1 can have any of several other suitable computer system configurations. For example, a user computing device 110 can be embodied as a mobile phone or handheld computer, and may not include all the components described above.

Figure 5:
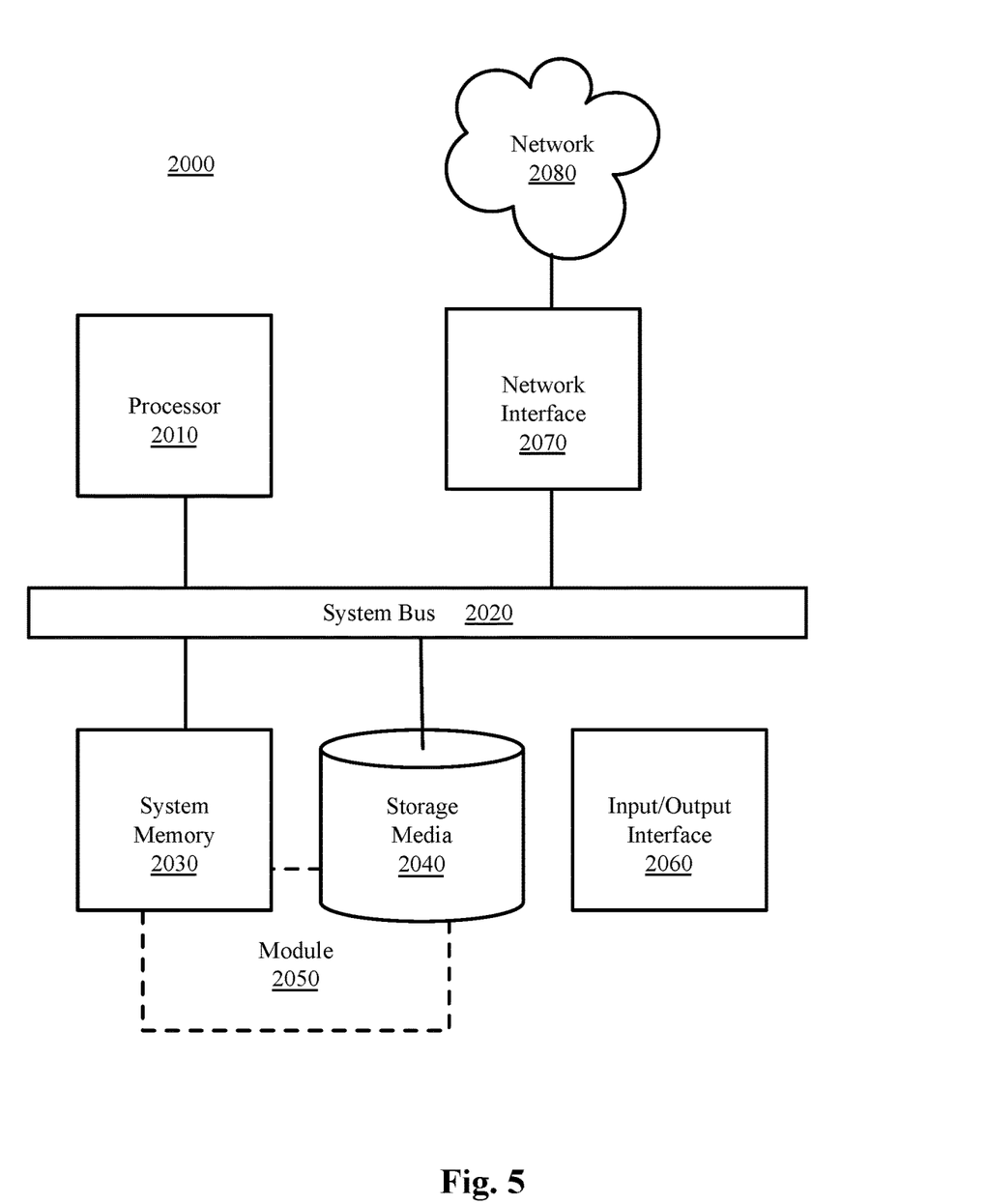
FIG. 5 is a block diagram depicting a computing machine and a module, in accordance with certain example embodiments.

In example embodiments, the network computing devices and any other computing machines associated with the technology presented herein may be any type of computing machine such as, but not limited to, those discussed in more detail with respect to FIG. 5. Furthermore, any functions, applications, or components associated with any of these computing machines, such as those described herein or any others (for example, scripts, web content, software, firmware, hardware, or modules) associated with the technology presented herein, may by any of the components discussed in more detail with respect to FIG. 5. The computing machines discussed herein may communicate with one another, as well as with other computing machines or communication systems over one or more networks, such as network 105. The network 105 may include any type of data or communications network, including any of the network technology discussed with respect to FIG. 5.

Example Processes

Figure 2:
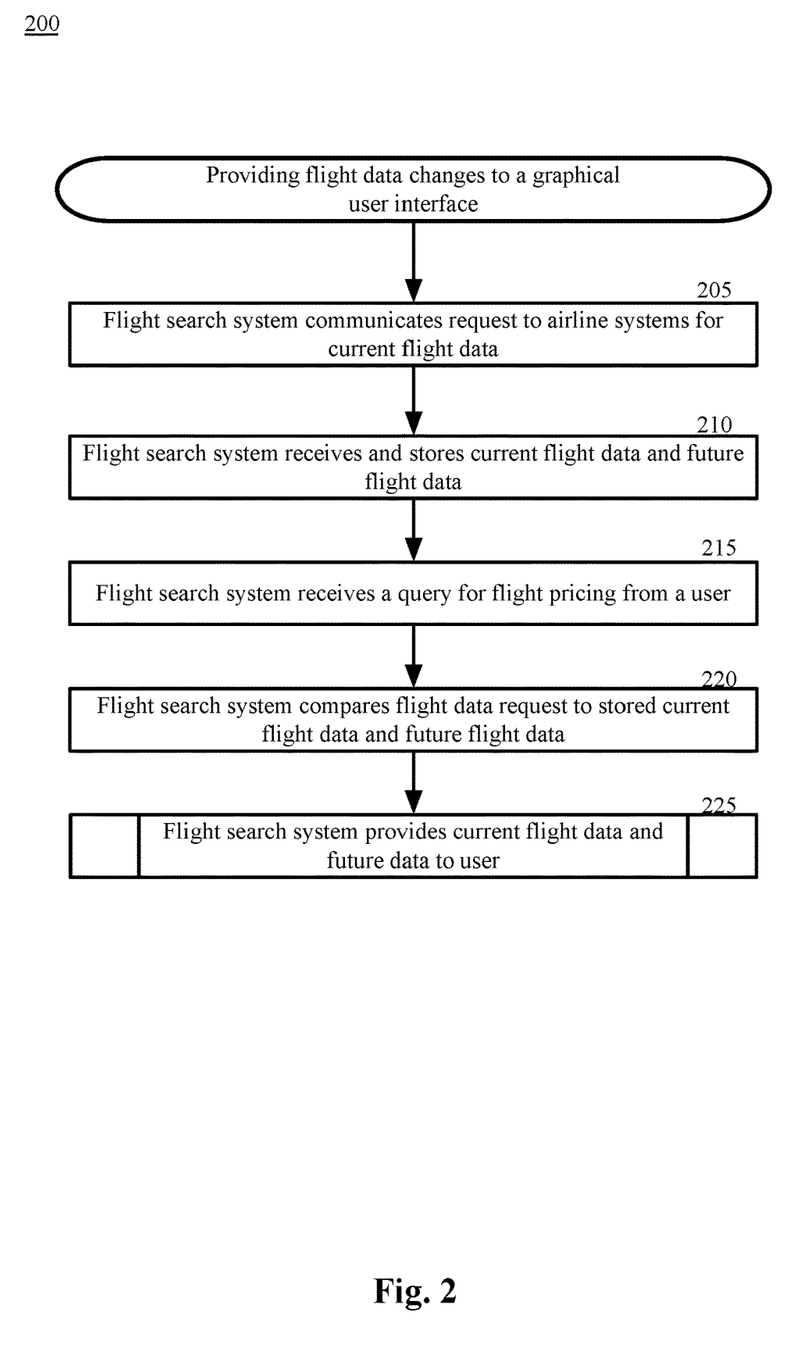
FIG. 2 is a block flow diagram depicting a method to provide potential flight data changes via a graphical user interface, in accordance with certain example embodiments.
Figure 3:
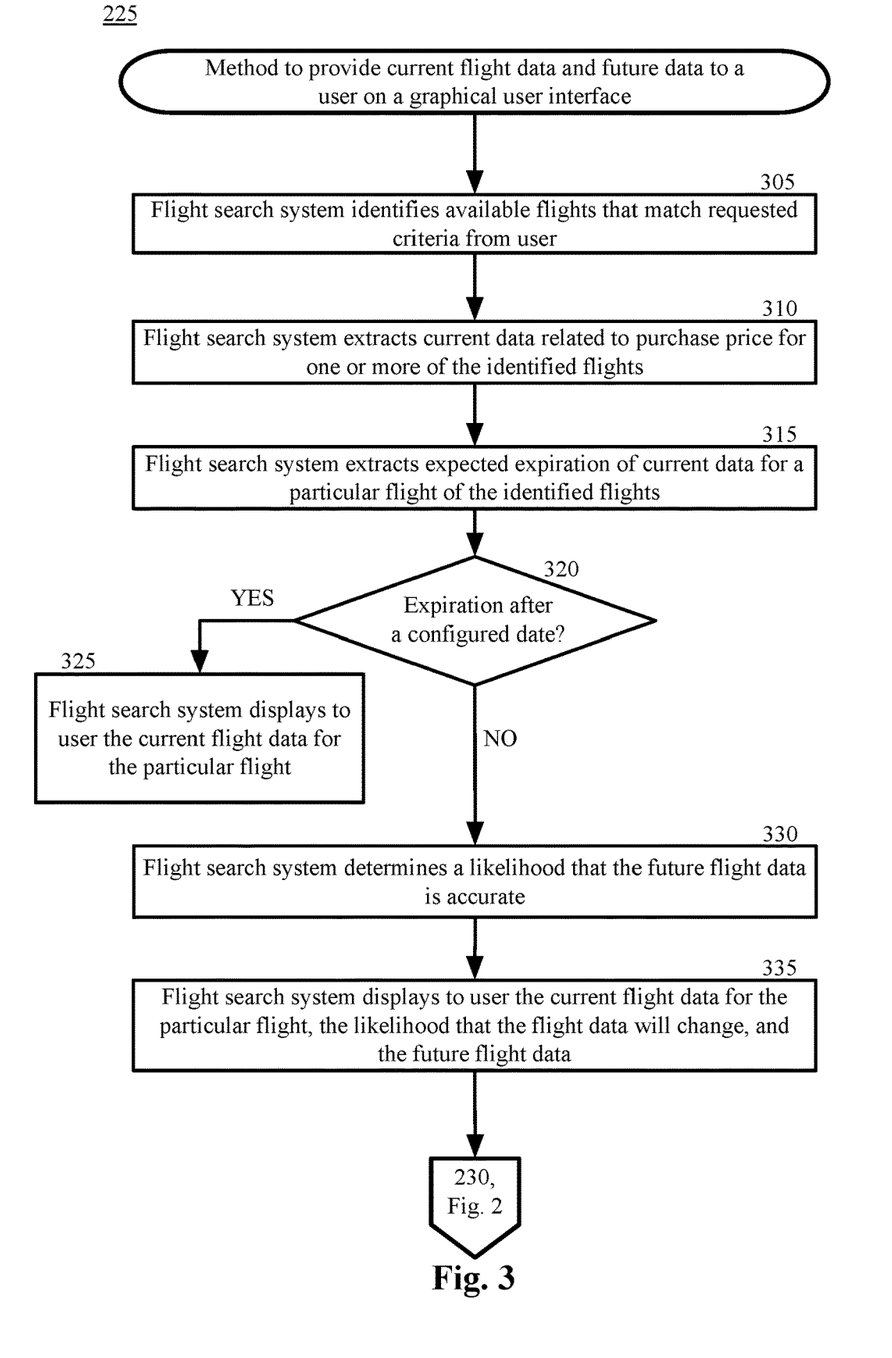
FIG. 3 is a block flow diagram depicting a method to provide current flight data and future data via a graphical user interface, in accordance with certain example embodiments.

The example methods illustrated in FIG. 2-3 are described hereinafter with respect to the components of the example operating environment 100. The example methods of FIG. 2-3 may also be performed with other systems and in other environments.

FIG. 2 is a block flow diagram depicting a method 200 to provide potential flight data changes to a graphical user interface, in accordance with certain example embodiments.

With reference to FIGS. 1 and 2, in block 205, a flight search system 140 communicates a request to one or more airline systems 130 for current flight data. The request may be for a particular flight, for a group of flights sharing a similar characteristic, such as a departure airport, for a group of the most popular flights, for all flights in a region, or for all flights for which flight data is available. Any suitable grouping of flights may be requested. For example, the group of flights in the request from the flight search system 140 may include all flights into and out of a particular airport associated with the airline system 130 for the next 45 days.

Alternatively, the request may be a continuing request for a period of time. For example, the flight search system 140 may request that an update of the flight data be transmitted for a group of flights every day for the next week, month, or indefinitely. The group of flights may be selected for the request based on a request from a user, based on the most frequently searched flights, based on the most frequently purchased flights, or based on any other suitable criteria.

The request may be communicated via an Internet message over the network 105, email, instant message, text, or any other suitable communication technology.

In an example, in the request for flight data, the flight search system 140 requests the current price for a particular group of flights, the expiration date of the current price, and a future price of the flights after the current prices expire. In another example, the flight data requested by the flight search system 140 includes the current price for a particular flight and the price for the particular flight if the ticket is bought the next day. Any other collection of current and future flight pricing may be requested. The flight data requested may include details about each flight in the group of flights, such as the destination and arrival airports, flight times, airplane type, flight restrictions, or any other suitable data.

In block 210, the flight search system 140 receives and stores current flight data and future flight data. The airline system 130 receives the request from the flight search system 140 and communicates the flight data to the flight search system 140. The flight data may include the current price for a particular flight, the expiration date of the current price, and a future price of the flight after the current price expires. In another example, the flight data includes the current price for a particular flight and the price for the particular flight the next day. Any other collection of current and future flight pricing may be provided. The flight data requested may include details about each flight in the group of flights, such as the destination and arrival airports, flight times, airplane type, flight restrictions, or any other suitable data.

The flight data may be communicated to the flight search system 140 via an Internet message over the network 105, email, instant message, text, or any other suitable communication technology. The flight search system 140 stores the flight data received from the airline system 130 in the flight search system server 145 or in any other suitable location. The flight data may be stored in a database or other suitable format for easy search and access by the flight search system 140. The database may be sorted by any available criteria, such as destination and arrival airports, flight times, airplane type, flight restrictions, or any other suitable data.

If the flight search system 140 requests flight search data for a large number of flights, maintaining a database of all the current flight data and the future flight data may be require a large amount of processing and storage capacity. Conventional flight search webpages are not able to devote the processing and storage capacity required to cache current and future flight data for use in searches by a user 101.

In block 215, the flight search system 140 receives a query for flight pricing from a user 101. The user 101 may submit a query by typing search functions into a graphical user interface 114 provided by the webpage 144 of the flight search system 140. For example, the graphical user interface 114 communicating with the webpage 144 may present to the user 101 on the communication application 112 of the user computing device 110 a flight search page with objects for receiving flight search data, such as destination and arrival airports, flight times, airline preference, or any other suitable data. In another example, the graphical user interface 114 communicating with the webpage 144 may receive an input of search data in a format that is not specific to a flight search, such as a free text entry into a generic search entry object. Any other suitable format may be presented on a graphical user interface 114 to the user 101 for entry of flight search data. In another example, the flight search data requested by the user 101 may be for a specific flight or group of flights. For example, the user 101 may enter a flight search for any flight from Atlanta to San Jose on October 21 of the current year.

In block 220, the flight search system 140 compares the flight pricing request to stored current flight data and future flight data. After receiving the flight search data from the user computing device 110, the flight search system 140 compares the flight search data to the database or other stored flight data and identifies flights that are relevant to the search. For example, if the flight search specified flights from Atlanta to San Jose on October 21 of the current year, then the flight search system 140 searches for flights in the database that match those requirements. In an example, 30 flights may fly the specified route on the specified day. Other flights in the database may match certain of the search criteria, but not others. For example, other flights might fly to from Atlanta to San Francisco on October 21.

In block 225, the flight search system 140 provides current flight data and future data to the user 101. The details of block 225 are described in greater detail with respect to method 225 of FIG. 3.

FIG. 3 is a block flow diagram depicting a method 225 to provide current flight data and future data to a graphical user interface 114, in accordance with certain example embodiments.

In block 305, the flight search system 140 identifies available flights that match requested criteria from user 101. When the flight search system 140 compares the flight search data to the database or other stored flight data, the flight search system 140 identifies flights that are relevant to the search. For example, a certain number of flights might match the all the elements of the flight search entry, such as the destination and arrival airports, flight times, and airline preference. Other flights may match certain of the elements of the flight search, such as destination and arrival airports and flight times, but not other elements, such as the airline preference.

The flight search system 140 may rank the identified flights based on any suitable criteria. For example, the flight search system 140 may rank higher flights that meet more of the elements of the flight search and rank lower flights that meet less of the elements of the flight search. The flight search system 140 may rank the identified flights based on other factors, such as lower priced flights may be ranked higher than flights that cost more. The flight search system 140 may rank nonstop flights higher than flights that require one or more stops. Any other suitable criteria may be used to rank the flights.

In block 310, the flight search system 140 extracts current data related to purchase price for one or more of the identified flights. The flight search system 140 determines the price to purchase a ticket for each flight on the list of identified flights. The price to purchase a ticket may be included in the flight data stored in the database on the flight search system server 145. In the example, the flight search system 140 extracts the purchase price from the flight data on the database and prepares the purchase price for presentation to the user 101 on the webpage 144.

In block 315, the flight search system 140 extracts an expected expiration of the current data for a particular flight of the identified flights. The flight search system 140 determines if the purchase price extracted for a particular flight from the database has an associated expiration time and date. For example, the current purchase price for a particular flight may only be valid until midnight of the current day. In another example, the current purchase price for a particular flight may be valid for five days. In another example, the airline system 130 may utilize a standard expiration date for all flight data, such as all flight data expires after 24 hours. In another example, the expiration date may be assumed because the subsequent price is posted with a starting time. For example, a price for a flight may be $300 if bought at the current price, but the subsequent price of $320 starts at midnight. Thus the $300 price expires before the $320 price begins.

In block 320, the flight search system 140 determines if the expiration is after a configured date. For example, the flight search system 140 may set a threshold time for the expiration date, such as and expiration of 24 hours from receipt, at midnight the day of receipt, 2 days from receipt, or any other suitable threshold amount of time. If the expiration date is after the configured threshold date, then the method 225 follows the YES branch of block 320 back to block 325.

Following the YES branch of block 320 to block 325, the flight search system 140 displays to the user 101 the current flight data for the particular flight. The display is produced on the graphical user interface 114 after a communication of the data is provided via the network 105 from the flight data system 140 to the user computing device 110. The user computing device 110 receives the data and interface instructions and updates the graphical user interface 114 accordingly to provide the data to the user 101.

When the expiration date is beyond the configured threshold, the flight search system 140 displays to the user 101 the current flight data, such as the price, on the graphical user interface 114. When the expiration is beyond the configured threshold, the flight search system 140 may elect not to provide any display related to future flight data, such as an increasing price for a ticket. For example, the flight search system 140 may only display future flight data when the future flight data is changing within the configured threshold, such as the next day. The current flight data may be displayed to the user 101 in any other suitable manner, such as a graphical user interface 114 on an application on the user computing device 110.

Returning to block 320, if the expiration date is after the configured threshold date, then the method 225 follows the NO branch of block 320 to block 330.

In block 330, the flight search system 140 determines a likelihood that the future flight data is accurate. The flight search system 140 analyzes the history of the flight data, industry standards, booking levels of the flight, industry trends, and other suitable factors to determine a likelihood that the flight data will change to match the future flight data. The likelihood may be quantified as the reliability of the future flight data. For example, the reliability of the future flight data is stated as a percentage, a score, or any other suitable representation of reliability of the future flight data.

In an example, the current flight data for a flight from a particular airline includes a current price of $300 and the future flight data indicates that the price will be $320 after midnight. The flight search system 140 analyzes the price history of the particular airline and determines that in 95% of the analyzed instances, the future price prediction was the actual price that the flight subsequently cost. Thus, the flight search system 140 predicts that the future price is 95% likely to be $320 after midnight. Stated another way, the future price is 95% reliable or has a "high" reliability.

In another example, the flight search system 140 relies on likelihood data provided by the airline system 130. For example, the airline system 130 provides current flight data, including a current price of $300, and future flight data, including a future price of $320 after midnight. The airline system 130 also provides a likelihood that the future price is 85% likely to be accurate. The flight search system 140 may display this likelihood to the user 101. Stated another way, the future price is 85% reliable.

In another example, the flight search system 140 determines that the industry trends are predicting that prices are going to increase by 10% by the next day. That is, price trends across all airlines are increasing by a predictable rate, and a 10% increase by the next day is 50% likely. If the future data for the flight indicates a 10% increase, then the industry trends may further support the likelihood that the 10% price increase will occur.

Any other suitable factors may be utilized to predict the likelihood that the future price is accurate.

In block 335, the flight search system 140 displays to the user the current flight data for the particular flight, the likelihood that the flight data will change, and the future flight data. The display is produced on the graphical user interface 114 after a communication of the data is provided via the network 105 from the flight data system 140 to the user computing device 110. The user computing device 110 receives the data and interface instructions and updates the graphical user interface 114 accordingly to provide the data to the user 101.

The flight search system 140 displays to the user 101 the current flight data, such as the price, on the graphical user interface 114. When the expiration is before the configured threshold date, the flight search system 140 displays some or all of the related future flight data, such as an increasing price for a ticket. For example, the flight search system 140 displays a flight price when the future flight data is changing within the configured threshold, such as the next day. The current flight data, the likelihood that the flight data will change, and the subsequent flight data may be displayed to the user 101 in any other suitable manner, such as a graphical user interface 114 on an application on the user computing device 110.

In an example, the flight search system 140 only displays the future flight price when the likelihood of the future price is higher than a certain threshold likelihood. For example, if the threshold likelihood is 80%, then the future price of the flight is only presented to the user 101 when the calculated likelihood is greater than or equal to 80%. If the calculated likelihood is less than 80%, the future price is not displayed to the user 101. In another example, the flight search system 140 uses the likelihood to determine if the future price is displayed, but the calculated likelihood is not displayed to the user 101.

In certain examples, the flight search system 140 only displays the future flight data to a user if the data is going to change in the next day. For example, if the price is likely to change in four days, the flight search system 140 does not display the future price. In certain examples, the flight search system 140 only displays future flight data, such as the future price, if the future price is going to increase. This display of the increased price will prompt a user 101 to make a purchase at the time of the search.

In an alternative example, the flight search system 140 displays the future price of a flight if the price is increasing, decreasing and/or remaining the same. For example, if the price is currently $300, but the price is 90% likely to drop to $250 at midnight, this flight data may be displayed to the user 101 as described and shown herein. The display of a decreasing price or a stationary price may prompt a user 101 to wait before making a purchase.

In another example, the flight search system 140 provides an offer to the user 101 to monitor the future flight data and provide a notification to the user 101 when the future flight data is soon to change. For example, if a price change is not happening before the configure threshold as described in block 320, the user 101 may elect to wait before purchase. The user 101 may select an option on the webpage 144 to be notified when the price change is within the configured threshold. In an example, if the configured threshold is one day and the current flight data expires in five days, the user 101 may elect to wait. The flight search system 140 monitors the future flight data and on day four, the price increase is indicated to happen in less than one day. The flight search system 140 may provide a notification to the user 101 that the price is increasing. For example, the notification may direct the user 101 to the graphical user interface 114. As shown in block 335, the webpage 144 may display the current flight data and the future flight data to the user 101.

The user 101 can see that the price is increasing the next day and is prompted to purchase the flight at that time.

Figure 4:
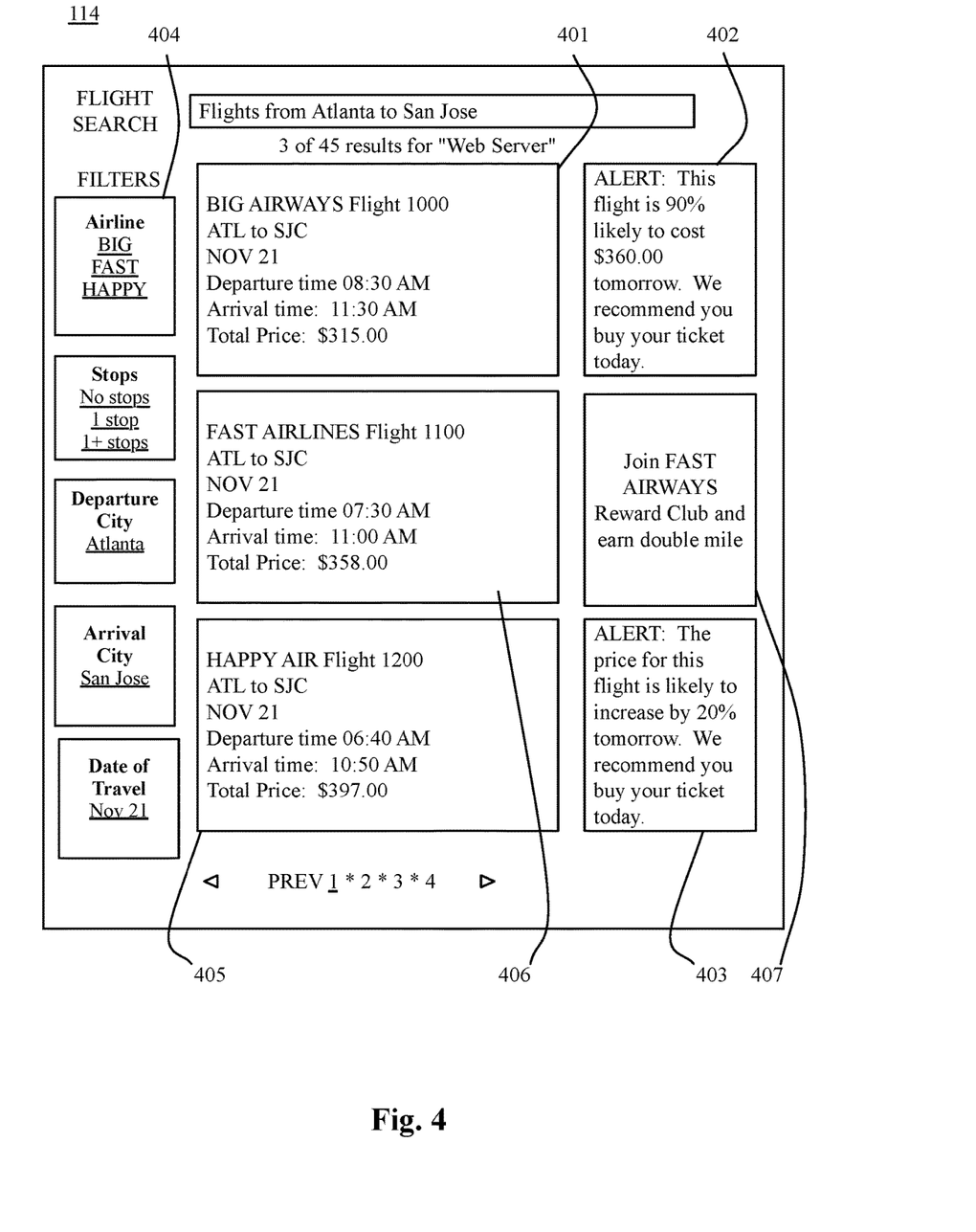
FIG. 4 is an illustration of an example graphical user interface displaying current flight data and future flight data, in accordance with certain example embodiments.

FIG. 4 is an illustration of an example graphical user interface 114 displaying current flight data and future flight data, in accordance with certain example embodiments. In the example, the graphical user interface 114 is displayed on a website 144 accessed by the communication application 112 on the user computing device 110 or in any other suitable manner. The example graphical user interface 400 depicts a flight search engine page with results from a flight search. The flight search returned results for three airlines, Big Airways, Fast Airlines, and Happy Air. The example graphical user interface 114 illustrates elements for further refining the search through the use of filters, such as the filter element 404. Filter element 404 would allow the user 101 to input a selection to include only flights from a particular airline of the three airlines shown in the filter element 404 by clicking a link for one of the airlines.

Each airline returned a flight that matched or nearly matched the search data input by the user 101. For example, Big Airways returned flight 1000 as shown in the display element 401. The flight 1000 shown on graphical user interface 400 illustrates the destination and arrival airport, the flight number, the date and times of the flights, and the current price.

In the example, the future flight data identified by the flight search system 140 indicated that the price was likely to increase to $360 the subsequent day. Therefore, the graphical user interface 114 displays the element 402 to inform the user 101 of the increase in the cost of the flight. In this example, the calculated likelihood of 90% is displayed to the user 101.

In the example of graphical user interface 114, Happy Air returned flight 1200 as shown in the display element 405. The flight 1200 shown on graphical user interface 114 illustrates the destination and arrival airport, the flight number, the date and times of the flights, and the current price.

In the example, the future flight data identified by the flight search system 140 indicated that the price was likely to increase by 20% the subsequent day. Therefore, the graphical user interface 114 displays the element 403 to inform the user 101 of the increase in the cost of the flight. In this example, the likelihood calculated is not displayed to the user 101. Only that the increase is "likely" based on the likelihood threshold used by the flight search system 140.

In the example of graphical user interface 114, Fast Airlines returned flight 1100 as shown in the display element 406. The flight 1100 shown on graphical user interface 114 illustrates the destination and arrival airport, the flight number, the date and times of the flights, and the current price.

In the example, the future flight data identified by the flight search system 140 indicated that the price was likely to decrease or remain stationary the subsequent day. Therefore, the graphical user interface 114 displays the generic element 407 that does not inform the user 101 of the projected price for the subsequent day.

Example Systems

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a wearable computer, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to render graphical user interfaces to display current and future data to users comprising, by one or more computing devices:
   receiving, from one or more travel systems, current flight data and future flight data for each flight of a group of flights;
   caching the received current flight data and the future flight data for each flight of the group of flights, wherein the received current flight data and the future flight data are cached in a storage location separate from a storage location associated with the one or more travel systems;
   receiving, from a user computing device, a flight search request comprising a flight data query, the flight search being input by a user into a graphical user interface hosted by the one or more computing devices;
   comparing, the flight search query with the cached current flight data and the future flight data for each of the group of flights;
   identifying, current flight data for a particular flight of the group of flight data for a particular flight of the group of flights that matches one or more features of the flight search query;
   determining, using the one or more computing devices, a reliability that the future flight data is accurate; and
   based on the determined reliability, displaying on the graphical user interface the current flight data and the future flight data, wherein the future flight data is displayed only when the determined reliability exceeds a specified threshold.

2. The computer-implemented method of claim 1, further comprising presenting the determined reliability for the future flight data on the graphical user interface.

3. The computer-implemented method of claim 1, wherein the current flight data comprises a current price and the future flight data comprises a future price for the particular flight.

4. The computer-implemented method of claim 3, wherein the current flight data and the future flight data for the particular flight are presented on the graphical user interface to the user only when the future price is greater than the current price.

5. The computer-implemented method of claim 1, further comprising:
   determining a time of expiration of the current flight data for the particular flight; and
   based on a determination that the expiration is before a configured time threshold, presenting the current flight data and the future flight data for the particular flight on the graphical user interface to the user.

6. The computer-implemented method of claim 1, wherein the reliability is calculated based on a flight data history of a provider of the current flight data and the future flight data.

7. The computer-implemented method of claim 1, wherein the reliability is calculated based on industry trends.

8. The computer-implemented method of claim 1, wherein the flight search request is input by a user into a flight search webpage provided by the one or more computing devices.

9. The computer-implemented method of claim 1, wherein the current flight data and the future flight data are cached on a database on the one or more computing devices.

10. A computer program product, comprising:
    a non-transitory computer-readable storage device having computer-executable program instructions embodied thereon that when executed by a computer cause the computer to render graphical user interfaces to display current and future data to users, the graphical user interfaces generated in response to search queries, the computer-executable program instructions comprising computer-executable program instructions to:
    receive, from one or more travel systems, current flight data and future flight data for each flight of a group of flights;
    cache the received current flight data and the future flight data for each flight of the group of flights, wherein the received current flight data and the future flight data are cached in a storage location separate from a storage location associated with the one or more travel systems;
    receive from a graphical user interface a flight search request comprising a flight data query;
    compare the flight data query with the cached current flight data and the future flight data for each of the group of flights;
    identify current flight data for a particular one of the one or more flights of the group of flights of the group of flights that matches one or more features of the flight search query;
    determine a reliability that the future flight data is accurate; and
    display on the graphical user interface the current flight data and the future flight data, wherein the future flight data is displayed only when the determined reliability exceeds a specified threshold.

11. The computer program product of claim 10, further comprising computer-executable program instructions to present the determined reliability for the future flight data.

12. The computer program product of claim 10, wherein the current flight data and the future flight data comprise a current price and a future price for the particular flight.

13. The computer program product of claim 12, wherein the current flight data and the future flight data for the particular flight are presented on the graphical user interface to the user only when the future price is greater than the current price.

14. The computer program product of claim 10, wherein the reliability is calculated based on a flight data history of a provider of the current flight data and the future flight data.

15. A system to render graphical user interfaces to display current and future data to users, the graphical user interfaces generated in response to search queries, comprising:
a storage resource; and
a processor communicatively coupled to the storage resource, wherein the processor executes application code instructions that are stored in the storage resource to cause the processor to:
communicate, to one or more travel systems, a request for current flight data and future flight data for a group of flights;
receive, from the one or more travel system, the current flight data and the future flight data for each flight of the group of flights;
cache the received current flight data and the future flight data for each flight of the group of flights, wherein the received current flight data and the future flight data are cached in a storage location separate from a storage location associated with the one or more travel systems;
receive from a user computing device a flight search request comprising a flight data query, the flight search request being input by a user into a graphical user interface;
compare the flight data query with the cached current flight data and the future flight data for each of the group of flights;
identify current flight data for a particular one of the one or more flights of the group of flights that matches one or more features of the flight search query;
determine a reliability that the future flight data is accurate; and
display, on the graphical user interface to the user, the current flight data and the future flight data, wherein the future flight data is displayed only when the determined reliability exceeds a specified threshold.

16. The system of claim 15, wherein the current flight data comprises a current price and the future flight data comprises a future price for the particular flight.

17. The system of claim 15, further comprising application code instructions to present the determined reliability for the future flight data on the graphical user interface.

18. The system of claim 15, further comprising application code instructions to:
determine a time of expiration of the current flight data for the particular flight; and
based on a determination that the expiration is before a configured time threshold, present the current flight data and the future flight data for the particular flight on the graphical user interface to the user.

19. The system of claim 15, wherein the reliability is calculated based on a flight data history of a provider of the current flight data and the future flight data.

20. The system of claim 15, wherein the current flight data and the future flight data are cached on a database on the storage resource.

* * * * *